Patented Jan. 30, 1940

2,188,320

UNITED STATES PATENT OFFICE 2,188,320

PROCESS FOR THE MANUFACTURE OF LEUCO SULPHURIC ACID ESTERS OF ALKYL ETHERS OF Bz-2,Bz-2'-DIHYDROXYDIBENZANTHRONE

Otto Stallmann, South Milwaukee, Wis., assignor to E. I. du Pont de Nemours & Company, Wilmington, Del., a corporation of Delaware No Drawing. Application January 24, 1938, Serial No. 186,751

4 Claims. (Cl. 260—355)

This invention relates to the preparation of water soluble leuco sulphuric acid esters of anthraquinone vat dyestuffs and more particularly to an improved process for the preparation of the leuco sulphuric acid esters of the alkylation products of Bz-2,Bz-2'-dihydroxydibenzanthrone.

Leuco sulphuric acid esters of vat dyestuffs are generally prepared by reacting the vat dyestuff in ketonic form with pyridine in the presence of a metal such as iron or copper, or by starting with the vat dyestuff in the ordinary leuco form which is directly reacted with a pyridine sulphurtrioxide addition product.

Due to the instability of the ordinary leuco compound of most anthraquinone vat dyestuffs, particularly those of the dibenzanthrone series, it is difficult to work with these colors in that form, especially in large scale operation. In all of the operations involving the use of the ordinary leuco compound air must be excluded by the use of inert or reducing gases or by employing an inert water insoluble organic compound to serve as a protective film on the reacting solutions, or a reducing condition must be maintained in the esterification process to prevent premature oxidation of the unstable, ordinary leuco compounds. In general however, the water soluble leuco sulphuric acid esters of vat dyestuffs, particularly the anthraquinone series are prepared by employing vat dyes in the ketonic form.

The use of vat dyestuffs in ketonic form, however, presents certain difficulties. In the first place, they are generally quite insoluble in pyridine, thereby necessitating the use of large amounts of pyridine as the reaction medium. Where metals are employed further difficulties have been experienced in the final purification of the color from metal, since the metals form pyridinium salts under the conditions of the reaction, from which it is very difficult to obtain the color in pure form.

While processes have been devised wherein the water-containing press cake of the color or the leuco compound of the color may be employed and dehydration effected directly in the pyridine or in inert hydrocarbon solvents, these processes require the use of extraordinarily large amounts of pyridine or other solvent per part of color employed, due to the high water content of the ordinary filter press cakes, because it is difficult to reduce the water content of a press cake of the ordinary vat dyestuff of the dibenzanthrone series either in the keto or leuco form to less than 80% of the total weight, particularly where a vatting procedure has been employed in the purification or preparation of the final product.

It is an object of this invention to provide an improved process for the preparation of leuco sulphuric acid esters of the alkylation products of Bz-2,Bz-2'-dihydroxydibenzanthrone, which is free from the difficulties experienced in the solubilization of vat dyestuffs of the series by the known processes.

It is a further object of the invention to provide a process for the preparation of leuco sulphuric acid esters of the alkylation products of Bz-2,Bz-2'-dihydroxydibenzanthrone in which the color is employed in the form of a reduction derivative which is stable to air oxidation and which is reconvertible to the ordinary leuco form in pyridine solution and is readily reacted upon by the esterifying agents heretofore employed in the preparation of leuco sulphuric acid esters.

A further object of the invention is to provide a process in which the stable leuco derivative employed is one which can be obtained in highly crystalline form and gives a filter cake of low water content of the type more particularly described in U. S. Patent 2,148,042.

A still further object of the invention is to provide an improved process for preparing the leuco sulphuric acid esters of the alkylation products of Bz-2,Bz-2'-dihydroxydibenzanthrone in substantially quantitative yields and of such high purity that they are exceedingly stable under ordinary conditions.

These and other objects of the invention will become apparent as the description proceeds.

I have found that exceedingly pure leuco sulphuric acid esters of the alkylation products of Bz-2,Bz-2'-dihydroxydibenzanthrone can be prepared from the stable leuco derivatives of these ethers which are more particularly described in U. S. Patent 2,148,042, and that the many difficulties encountered in the solubilization of these colors when in ketonic form or in the common leuco form are thereby avoided.

These new stable leuco derivatives (which may be prepared by carefully reducing the alkalinity of a vat of the parent dyestuff with sodium bisulphite to a point where a stable olive colored leuco derivative precipitates out in the absence of any of the common leuco derivatives when the vat is maintained at temperatures of from 60 to 90° C.), react very readily and quantitatively at moderate temperatures with the pyridine-sulphurtrioxide or pyridine-carbylsulphate, addition products in pyridine solutions or suspension, without the use of metals or any additional reducing agents, to form leuco sulphuric acid ester compounds.

These leuco sulphuric acid esters may be isolated from the esterification mass in what appears to be the pyridine salt, which upon treatment with dilute alkalies and distillation of the pyridine are converted to the alkali-metal salts and as such may be salted out of the remaining solution in the ordinary manner. These alkali-metal salts are in exceptionally pure form and exhibit materially increased stability over the leuco sulphuric acid esters prepared by the use of metals.

The following examples are given to illustrate the invention more fully. The parts used are by weight.

Example 1

20 parts of oleum (60%) are added at 40° to 60° C. to 100 parts of dry pyridine under agitation. 5 parts of the dry, pulverized stable leuco-derivative obtained from purified dimethoxydibenzanthrone (according to Example 1 of U. S. Patent 2,148,042) are added to the mass, care being taken to prevent undue exposure of the color to the pyridine fumes in combination with air above the liquid mass, and the mass is heated at 50° C. for two hours.

The deep red colored solution is then poured into 600 parts of an aqueous solution, containing 20 parts of soda ash and then stirred for one-half hour. The pyridine is removed by distillation in vacuo and the solution is filtered. The filtrate is evaporated in vacuo to 135 parts of a color paste, containing the disodium salt of the leuco disulphuric acid ester of Bz-2,Bz-2'-dimethoxydibenzanthrone of high purity. It dyes fibers in bright bluish green shades when applied in the usual manner, and is exceptionally stable under ordinary conditions.

Example 2

50 parts of chlorosulphonic acid are added carefully at room temperature to 350 parts of dry pyridine under agitation. 50 parts of the dry, pulverized stable leuco derivative of dimethoxydibenzanthrone (U. S. Patent 2,148,042) are then added and the mass is stirred and heated to 70° C. where it is held for 10 minutes.

The bright red colored solution is cooled to room temperature and poured into 2000 parts of water, containing 75 parts of soda ash in solution.

The pyridine is distilled off in vacuo, the remaining solution is filtered and the filterate is salted slowly at 70° C. under agitation with 25 parts of soda ash (or sodium chloride) for each 100 parts of the solution.

The highly crystalline disodium salt of leucosulphuric acid ester of dimethoxydibenzanthrone thus obtained is filtered off and the cake is milled to a color paste of desired strength.

The product is identical in its dyeing properties to the product of Example 1. If 15 parts of potassium chloride are used for each 100 parts of the solution in place of sodium carbonate, the dipotassium salt is precipitated. It exhibits similar dyeing properties.

Example 3

50 parts of the concentrated filter cake, containing 25 parts of the stable leuco derivative of dimethoxydibenzanthrone employed in the above examples are added to 215 parts of toluene and the mass is distilled free of water under agitation, by finally raising the temperature to 110° C. To the remaining suspension (consisting of 25 parts of the leuco compound in 65 parts of dry toluene), there is added at 50° to 60° C. a solution obtained from 38 parts of chlorosulphonic acid and 200 parts of dry pyridine. The mass is stirred at 65° to 70° C. for 15 minutes and then poured into 1000 parts of water, containing 50 parts of soda ash in solution.

The pyridine and toluene are removed by steam distillation in vacuo and the residual solution is filtered to remove any regenerated dimethoxydibenzanthrone which may be present. The filtrate contains the leuco-sulphuric acid ester of the dimethoxydibenzanthrone identical with the product of Example 1.

Example 4

200 parts of a filter cake equivalent to 100 parts of the dry, olive colored stable leuco derivative of dimethoxydibenzanthrone as described in U. S. Patent 2,148,042 are added to 500 parts of crude, technical pyridine.

The solution is distilled under agitation at temperatures from 93° to 115° C., while maintaining an atmosphere of carbon dioxide gas above the liquor level in the flask, and while distilling off the diluted pyridine, until finally an anhydrous well stirrable and deep red colored residual mass, consisting of 100 parts of the dry leuco, dissolved or suspended in 130 parts of dry pyridine is obtained, which is then cooled to 60° C.

A suspension, previously prepared by adding 140 parts of chlorosulphonic acid to 400 parts of pyridine is then added, and the mass is stirred for one-half hour at 60° to 65 C. The deep red colored solution is poured into 3500 parts of cold water and stirred for several hours, until the pyridinium salt of the leuco-sulphuric acid ester is completely precipitated out of solution in the form of large, well defined, deep red colored crystals.

The precipitate is filtered off, the filter cake is washed with 500 parts of cold water and then dissolved in 1000 parts of water, containing 75 parts of soda ash in solution.

The pyridine is removed by steam distillation in vacuo and the residual solution is clarified by filtration. 50 parts of soda ash are stirred into the filtrate and the solution is evaporated to dryness in vacuo. The product obtained is identical in properties with the product of Example 1, and is stable in air under normal conditions.

Instead of removing the pyridine by the steam distillation as above described, it may be removed by adding to the soda ash a compound such as ethylene chlorohydrin which will react with the excess pyridine to form a water soluble pyridinium salt that is stable in alkaline solution and which will remain in solution during the salting operation employed in separating out the leuco-sulphuric acid ester of the vat dyestuff.

A slight excess of ethylene chlorohydrin should be employed over that theoretically necessary to convert all of the remaining pyridine to the water soluble salt. The ethylene chlorohydrin need not be anhydrous but may be employed as an aqueous solution in the form it is ordinarily available commercially. The leuco-sulphuric acid ester in the form of the pyridine salt is treated with the soda ash in aqueous solution as above described. The aqueous solution of the ethylene chlorohydrin containing slightly in excess of 2 moles of ethylene chlorohydrin per mole of dyestuff present in the mass is added and the solution is stirred at 25 to 45° C., for 1 hour. The dyestuff is then salted out in the same manner as when the pyridine has been removed by distillation.

The yield is practically quantitative and the product gives equally strong and considerably brighter dyeings and prints than the product now on the market.

*Example 5*

40 parts of carbylsulphate are added at 50 to 60° C. to 40 parts of dry pyridine and the mass is stirred for 20 minutes at 60° C. This mixture is then stirred into 60 parts of pyridine to which has been added 40 parts of the dry, pulverized stable leuco compound of Bz-2,Bz-2-dimethoxy-dibenzanthrone as employed in Example 1 with the exclusion of air by means of illuminating gas.

The mass is heated under agitation at 55° to 60° C. for one-half hour, and then poured into 600 parts of a 10% soda ash solution.

After stirring for 15 minutes, the mass is steam distilled free from pyridine in vacuo. The residual solution is filtered and to the filtrate is added enough potassium chloride at 50–55° C. to bring the concentration to 15% by volume of KCl.

The precipitate, consisting of large red crystals, is filtered off, washed with 200 parts of a solution, containing 10% KCl and 5% $K_2CO_3$ and then milled to a 15% color paste.

*Example 6*

50 parts of the filter cake obtained according to Example 7 of U. S. Patent 2,148,042, equivalent to 16.7 parts of the dry stable leuco derivative of the reaction product of Bz-2,Bz-2'-dihydroxydibenzanthrone and ethylene dibromide, are added under agitation to 200 parts of technical pyridine, air being excluded from the pyridine vapor above the liquid during the addition by carbon dioxide gas.

The deep red colored solution is distilled to a temperature of 117° C. until finally 50 parts of an anhydrous residual mass are obtained, consisting of the dry leuco compound, suspended in pyridine, which is then cooled to 60° C.

A solution, previously prepared from 150 parts of dry pyridine and 40 parts of chlorosulphonic acid, is added at 60° C. and the deep red colored solution is further heated at 90° to 93° C. for one-half hour. It is then poured into a solution containing 60 parts of soda ash in 1000 parts of cold water.

The pyridine is steam distilled off in vacuo and the residual solution is filtered.

The deep red colored filtrate is warmed to 40° C. and potassium carbonate is stirred slowly into the solution, until finally the dipotassium salt of the disulphuric acid ester of the ethylene dibromide alkylation product of Bz-2,Bz-2'-dihydroxydibenzanthrone is precipitated in the form of red colored crystals. The precipitation is usually completed when a concentration of 15% $K_2CO_3$ by weight has been reached.

The precipitate is filtered off and the cake may be milled to a smooth color paste of desired strength from which blue dyeings and prints are obtained upon acid oxidation with nitrous acid, similar in shade and fastness properties to those obtained from the parent ketonic dyestuff when applied to the fiber by the usual vatting methods.

The disodium salt of the same leuco-sulphuric acid ester may be obtained in the same manner by employing somewhat larger amounts of sodium chloride in place of the potassium carbonate.

*Example 7*

40 parts of the paste of the stable leuco derivative, (obtained from ten parts of the purified 1,3-dichloro-2-butene ether of Bz-2,Bz-2'-dihydroxydibenzanthrone according to Example 10 of U. S. Patent No. 2,148,042, equivalent to 10 parts of the dry stable leuco derivative, are suspended in 150 parts of technical pyridine under agitation.

The mass is distilled preferably in an atmosphere of carbon dioxide gas, at temperatures from 93° to 117° C., until a highly viscous mass, consisting of the leuco, suspended in 35 parts of dry pyridine remains. It is then cooled to 60° C., and a solution, previously prepared from 100 parts of dry pyridine and 20 parts of chlorosulphonic acid, is then added and the mass is heated at 70° to 73° C. for one-half hour. The deep red colored fusion mass is poured into 500 parts of water, containing 50 parts of triethanolamine in solution, and the pyridine is removed by steam distillation in vacuo.

The residual mass is further diluted with warm water and filtered and the filtrate is evaporated in vacuo to a concentrated paste, consisting of the triethanolamine salt of the leuco-sulphuric acid ester of the parent vat blue, in admixture with salts of triethanolamine (hydrochloride and sulphate), dissolved in water.

The deep red colored product dyes and prints fiber in brownish-red shades, which are developed by the usual oxidation treatment (with nitrous acid or acid chlorate solutions), giving the same blue shades, as are obtained by applying the ketonic parent vat dyestuff to the fiber by conventional vat dyeing and printing methods.

The alkali metal salts of this novel leuco-sulphuric acid ester are sufficiently soluble in water to give skein dyeings and paddings on piece goods, when applied by conventional dyeing methods for leuco sulphuric acid esters of vat dyestuffs.

*Example 8*

13 parts of the dry powdered stable leuco derivative of the 1,3-dibromo-propane alkylation product of Bz-2,Bz-2'-dihydroxydibenzanthrone (Example 9, U. S. Patent 2,148,042) are added to 120 parts of dry pyridine to which 20 parts of chlorosulphonic acid have been previously added. The mass is heated at 60° C. for ½ hour. It is then poured into 500 parts of a 2% sodium carbonate solution and agitated for ½ hour. The pyridine is then removed by a steam distillation and the residual solution is diluted to 1000 parts and filtered. The filtrate is salted slowly at 40° C. with 240 parts of a mixture consisting of equal parts of potassium carbonate and potassium chloride, and the dipotassium salt of the leuco disulphuric acid ester of the parent color is filtered off. It may be further purified by redissolving the cake in water and reprecipitating with a mixture of potassium carbonate and chloride. The dipotassium salt of the leuco sulphuric acid ester of the parent color is obtained as red crystals and dyes fibers in brownish-red shades which are regenerated by the usual acid oxidation treatment to the bluish green shades of the parent color.

*Example 9*

54 parts of a paste equivalent to 25 parts dry stable leuco of the alkylation product of Bz-2,Bz-2'-dihydroxydibenzanthrone with ethylene dibromide (Example 7, U. S. Patent 2,148,042) are dehydrated in 200 parts of pyridine to a final weight of 50 parts by distilling to a temperature of 115°–117° C., in an atmosphere of carbon dioxide.

To this solution there are added at 50° C., 75 parts of the pyridine-carbylsulphate addition compound, (which has been freed from any traces of pyridine-sulphurtrioxide by repeated extraction with pyridine at 60° C.) and 40 parts of dry pyridine.

The reaction mixture is agitated at 65 C. for one-half hour, then poured under agitation into 400 parts of cold water, stirred 3 hours and allowed to settle. It is then filtered and the filter cake is dissolved in 600 parts of a 5% $Na_2CO_3$ solution. The pyridine is removed by steam distillation in vacuo. The residual mass is filtered and the filtrate is diluted up to 1300 parts with water. It is then salted with 150 parts of potassium chloride at 40° C. The potassium salt of the leuco sulphuric acid ester is thus obtained as a red crystalline body which is water soluble and may be regenerated to the parent color by the usual method.

It will be understood that other sulphur trioxide liberating agents may be employed with the pyridine for the preparation of the pyridine sulphur trioxide addition product, or the previously prepared pyridine sulphur trioxide compound may be employed in this reaction. Other modifications and alternations of the process will be obvious to those skilled in the art.

This particular invention is directed primarily to the esterification of the new stable leuco derivatives of the alkylation products of Bz-2,Bz-2'-dihydroxydibenzanthrone by any of the processes which have heretofore been employed for preparing leuco sulphuric acid esters of vattable compounds. Since no metals need be employed in this process, the use of higher temperatures or a longer time of reaction of the stable leuco derivative with the sulphuric acid esterifying agents do not give over-reduction or decomposition of the vat color, often experienced where metals are employed. A commercial or ordinary technical grade of pyridine may be used provided all the water is removed before the addition of the esterifying agent. The concentration of the pyridine melt in respect to the leuco vat color may be varied within wide limits so long as enough pyridine is employed to give a stirrable fluid mass. The particular crystalline form of these new stable leuco derivatives permits the preparation of filter cakes containing as high as 50% color solids and these high color solid content pastes can therefore be dehydrated in commercially practical amounts of pyridine.

As illustrated in the above examples, the filter cake may be dehydrated in an inert organic solvent which can be carried through in the solubilization reaction after the addition of the pyridine containing esterifying agents without detriment to the process. Where these new stable leuco sulphuric acid esters of alkyl ethers of dihydroxydibenzanthrone are employed, not only the objectionable features heretofore experienced in the preparation of these leuco sulphuric acid esters are eliminated but a higher yield of a leuco sulphuric acid ester of higher purity is obtained than by those esterification processes involving the use of metals or the ordinary leuco compound in free form. Where in the process due to some side reaction any of the stable leuco compound has been oxidized back to the original ketonic form, it may be separated out by the filtration procedure prior to isolation of the final solubilized color, and since it is not contaminated by metals or metal salts it can again be employed directly for the formation of the stable leuco derivative, whereas ordinarily in the processes involving the use of metals these unreacted products were so contaminated with other impurities that recovery of the reconverted color is not practical.

I claim:

1. In the process for the manufacture of leuco sulphuric acid esters of the alkylation products of Bz-2,Bz-2'-dihydroxydibenzanthrone, the step which comprises employing as the starting material a leuco derivative of the alkylation product of Bz-2,Bz-2'-dihydroxydibenzanthrone which is stable under normal conditions, substantially insoluble in cold dilute aqueous alkalis, and convertible to the common leuco form of the parent dyestuff when heated in strong caustic alkalies or in dilute caustic alkali solutions in the presence of strong organic nitrogen bases said stable leuco derivative being relatively insoluble in inert organic solvents and soluble in pyridine with the characteristic bright red color of the common leuco compounds from which they have been derived, which color changes on oxidation to the color characteristic of the pyridine solution of the parent ketonic dyestuff.

2. In the process for preparing leuco sulphuric acid esters of the alkylation derivatives of Bz-2,Bz-2'-dihydroxydibenzanthrone, the steps which comprise adding a stable leuco derivative of the parent color in the form of a filter cake containing water to pyridine, distilling the resulting mass until it is free of water, and effecting esterification of the leuco derivative in pyridine to the leuco sulphuric acid ester, the leuco derivative employed being stable under normal conditions, substantially insoluble in cold dilute aqueous alkalies, and convertible to the common leuco form of the parent dyestuff when heated in strong caustic alkalies or in dilute caustic alkali solutions in the presence of strong organic nitrogen bases, said stable leuco derivative being relatively insoluble in inert organic solvents and soluble in pyridine with the characteristic bright red color of the common leuco compounds from which they have been derived, which color changes on oxidation to the color characteristic of the pyridine solution of the parent ketonic dyestuff.

3. In the process for the preparation of the leuco sulphuric acid esters of the alkylation products of Bz-2,Bz-2'-dihydroxydibenzanthrone, the step which comprises reacting a stable leuco derivative of the alkylation products of Bz-2,Bz-2'-dihydroxydibenzanthrone with a sulphuric acid esterifying agent in the presence of an organic base, said leuco derivative being stable under normal conditions, substantially insoluble in cold dilute aqueous alkalies, and convertible to the common leuco form of the parent dyestuff when heated in strong caustic alkalies or in dilute caustic alkali solutions in the presence of strong organic nitrogen bases, said stable leuco derivative being relatively insoluble in inert organic solvents and soluble in pyridine with the characteristic bright red color of the common leuco compounds from which they have been derived, which color changes on oxidation to the color characteristic of the pyridine solution of the parent ketonic dyestuff.

4. In the process for the manufacture of leuco sulphuric acid ester of Bz-2,Bz-2'-dimethoxydibenzanthrone, the step which comprises employing as the starting material a leuco derivative of Bz-2,Bz-2'-dimethoxydibenzanthrone which is an olive colored compound, stable under normal conditions, substantially insoluble in cold dilute aqueous alkalies, and convertible to the common leuco form of the parent dyestuff when heated in strong caustic alkalies or in dilute caustic alkali solutions in the presence of strong organic nitrogen bases, said stable leuco derivative being relatively insoluble in inert organic solvents and soluble in pyridine with the characteristic bright red color of the common leuco compound of dimethoxydibenzanthrone which color changes on oxidation to the color characteristic of the pyridine solution of the parent ketonic dyestuff.

OTTO STALLMANN.